(12) United States Patent
Baitz et al.

(10) Patent No.: US 6,241,149 B1
(45) Date of Patent: Jun. 5, 2001

(54) MULTIFUNCTIONAL MODULAR OPERATOR UNIT FOR COMMERCIAL USE

(75) Inventors: Günter Baitz; Hartmut Kamin, both of Berlin (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/254,790

(22) PCT Filed: Nov. 25, 1997

(86) PCT No.: PCT/DE97/02755

§ 371 Date: Mar. 11, 1999

§ 102(e) Date: Mar. 11, 1999

(87) PCT Pub. No.: WO98/39748

PCT Pub. Date: Sep. 11, 1998

(30) Foreign Application Priority Data

Mar. 3, 1997 (DE) .......................................... 297 03 847 U

(51) Int. Cl.[7] ...................................................... G07G 1/00
(52) U.S. Cl. ............................................. 235/7 R; 235/375
(58) Field of Search ........................................ 235/375, 380, 235/7 R, 7 A; 902/30, 34, 8; 108/7, 20, 32, 142; 186/61; 248/183, 92; 361/680

(56) References Cited

U.S. PATENT DOCUMENTS

| 4,365,561 | 12/1982 | Tellier et al. . | |
|---|---|---|---|
| 4,852,830 | * 8/1989 | Howard et al. | 248/183 |
| 4,923,154 | 5/1990 | Konkel . | |
| 4,988,851 | * 1/1991 | Kohno et al. | 186/61 X |
| 5,316,107 | * 5/1994 | Wieschemann et al. | 186/61 |
| 5,448,044 | 9/1995 | Price et al. . | |
| 5,479,530 | * 12/1995 | Nair et al. | 382/119 |
| 5,756,978 | * 5/1998 | Soltesz et al. | 235/380 |
| 6,073,838 | * 6/2000 | Baitz et al. | 235/380 |

FOREIGN PATENT DOCUMENTS

| 30 11 934 A 1 | 3/1980 | (DE) . |
|---|---|---|
| 0 309 206 A2 | 9/1987 | (EP) . |
| WO 90/15559 | 6/1989 | (EP) . |
| WO 95/01879 | 7/1993 | (EP) . |
| WO 96/27861 | 3/1995 | (EP) . |
| 0 710 938 A2 | 9/1995 | (EP) . |

* cited by examiner

Primary Examiner—Karl D. Frech
(74) Attorney, Agent, or Firm—Schiff Hardin & Waite

(57) ABSTRACT

A modular operator unit, in particular for a cash register, having a block which includes a display unit and/or at least one keypad and/or a swipe-through magnetic card reader and which has a cable duct extending through the block to peripheral devices attached to opposing ends of the block and wherein one of the peripheral devices can be pivoted about a horizontal or a vertical axis and the other of the peripheral devices can be flange-mounted to a side wall or opposing end of the block.

20 Claims, 2 Drawing Sheets

MULTIFUNCTIONAL MODULAR OPERATOR UNIT FOR COMMERCIAL USE

BACKGROUND OF THE INVENTION

Field of the Invention

The present invention relates generally to multifunctional modular computer/operator/keyboard units for commercial use. More specifically, the present invention relates to such multifunctional units for use in the retail environment, such as a cash register.

WO 96/27861 A1 discloses an operator unit in which various input devices, namely a soft key bar, an input keypad and a swipe-through magnetic card reader are joined one to the other in any desired combination, but in a fixed arrangement, on a display unit. The devices have side profiles which correspond to one another so that the operator unit has the appearance of a monolithic block. The devices are designed and connected to one another in such a way that a duct is produced which runs through all the devices on their inside and which is also used as a cable duct. The connecting cables of all the devices can be fed through this cable duct to an outgoing cable unit which is common to said devices. The outgoing cable unit also serves as a means of mounting the operator unit on a stand.

The known arrangement permits adjustment of the angle of inclination of the entire unit. This may be sufficient if input media which only have to be operated by the press of a finger are used. However, if reading devices which also operate automatically, such as bar code readers or OCR readers, are used, only a compromise setting for the angle of inclination of the operator unit is possible. The same applies to a printer, for example a receipt printer, in which the intention is that a customer should also be able to access a printed product. A supplementary device, for example a pay terminal with a display and/or a keypad and/or a cheque card reader or money value unit reader, which would have to be operated both by a customer and by an assistant and which would be mounted on the block in this way would, however, only be able to be operated by one of the two categories of person if the entire operator unit were pivoted. However, a customer would then be able to access operator elements whose operation is reserved for the assistant.

Therefore, there is a need for an improved modular design concept for the operator unit of a device to such an extent that the various parts of the device can be adjusted relative to one another.

SUMMARY OF THE INVENTION

The above need is satisfied by a first exemplary embodiment of the present invention, which provides a peripheral device which can be pivoted in its inclined attitude about a horizontal and/or vertical axis can be flange-mounted onto a side wall of the block, and the cable duct is continued in the peripheral device. In this way, it becomes possible to use, for example, a bar code reader or OCR reader on the known block and to set it at an angle of inclination with respect to the space through which bar codes or OCR marks which are attached to articles which are to be billed are passed, without moving the block from the position which is ergonomically the most convenient for the user. The same applies to a printer, for example a receipt printer, which can then be moved into a position in which an operator and a customer can access the printed product. The connection cables of the peripheral devices are guided here in a concealed way so that the hands or articles are prevented from becoming caught on them.

The side walls of the block and of the peripheral device which face one another can be connected to one another here by means of a tubular coupling part, preferably a swan neck.

In another embodiment, the housing of the peripheral device is composed of a lower housing component and an upper housing component which are connected to one another in an articulated fashion. The side walls, facing one another, of the block and of the lower housing component are rigidly connected to one another and the cable duct is continued in the lower housing component. Preferably, the articulated connection between the lower housing component and the upper housing component is enclosed by a folding bellows.

According to a second exemplary embodiment of the invention in which the block has a rear wall which is bounded laterally by rear edges, the pivot axis runs in the mutually adjacent rear edge areas of the block and of a supplementary device. The mutually facing rear edge areas of the block and of the supplementary device are preferably connected to one another here in turn by means of a tubular coupling part, the pivot axis running coaxially with respect to the longitudinal axis of the coupling part.

The supplementary device, which may be a pay terminal for example, can be placed in a position in which it is located next to the block in a row with it. In this position, all the peripheral devices of the block and the supplementary device can be operated from one side, the operator side. The supplementary device can, however, also be pivoted about the coupling part, at maximum into a position in which its rear side is in parallel with the rear side of the block. In this position, the block can be operated from the operator side and the supplementary device can be operated from a customer side which is located opposite it.

In addition, the supplementary device or else the block can be held on the coupling part so as to be displaceable in the axial direction. For this purpose, the coupling part is preferably designed as a vertical pipe. The axial displaceability has the advantage that the height of the block and of the supplementary unit can be set at an ergonomically convenient height for each of the users. For example, the block is set at a low height which is convenient for a seated operator, while a customer who is generally standing finds a higher position pleasant.

In an embodiment, the present invention provides a modular operator unit comprising a block comprising at least one central device selected from the group consisting of a display unit, a keypad and a swipe-through magnetic card reader. The block further comprises first and second opposing ends. The operator unit further comprises a cable duct and first and second peripheral devices. The cable duct extends through the block and connects the first opposing end of the block to the first peripheral device. The cable duct further connects the second opposing end of the block to the second peripheral device. The first peripheral device is capable of being pivoted about a horizontal axis with respect to the central device. The second peripheral device is capable of being pivoted about a vertical axis with respect to the central device.

In an embodiment, the first peripheral device comprises an end facing the opposing end of the block. The end of the first peripheral device is connected to the first opposing end of the block by a tubular coupling part.

In an embodiment, the tubular coupling part is a swan neck coupling part.

In an embodiment, the tubular coupling part is in alignment with the cable duct.

In an embodiment, the housing of the second peripheral device comprises a lower housing component and an upper housing component. The lower housing component is flexibly connected to the upper housing component. The second peripheral device further comprises an end facing the second opposing end of the block. The end of the second peripheral device is rigidly connected to the second opposing end of the block.

In an embodiment, the cable duct extends into the lower housing component of the second peripheral device.

In an embodiment, the lower housing component of the second peripheral device is connected to the upper housing component by a folding bellows.

In an embodiment, the present invention provides a modular operator unit which comprises a block comprising at least one central device selected from the group consisting of a display unit, a keypad and a swipe-through magnetic card reader. The block further comprises a rear wall and two opposing ends. One opposing end of the block is connected to a first peripheral device. The other opposing end of the block, at the rear wall, is pivotally connected to a second peripheral device. The second peripheral device is capable of being pivoted about a vertical pivot axis perpendicular to the rear wall of the block.

In an embodiment, the rear wall of the block and the second peripheral device are connected by a tubular coupling part. The vertical pivot axis is coaxial with respect to a longitudinal axis of the tubular coupling part.

In an embodiment, the second peripheral device is displaceable along the vertical axis.

In an embodiment, the second peripheral device comprises a ball-and socket joint attached to the tubular coupling part.

In an embodiment, the block is displaceable along the vertical axis.

In an embodiment, the block comprises a ball-and-socket joint attached to the tubular coupling part.

In an embodiment, the tubular coupling part comprises a vertical pipe.

In an embodiment, the tubular coupling part is attached to a horizontal base selected from the group consisting of a table, a floor and a stand.

In an embodiment, the block and the second peripheral device are connected by a coiled cable which wraps around the tubular coupling part.

In an embodiment, the block and the second peripheral device are further connected to one another by means of a wireless telecommunications link.

In an embodiment, the wireless telecommunications link is an infrared telecommunications link.

In an embodiment, the operator unit further comprises a plurality of supplementary devices mounted to the vertical pipe.

In an embodiment, the vertical pipe is a strut of a shelf unit which comprises at least one shelf and wherein at least one of the supplementary devices is assigned to the shelf.

In an embodiment, the second peripheral device is a pay terminal comprising at least one device selected from the group consisting of a display, a keypad, a check card reader and a money value unit card reader.

Other objects and advantages of the present invention will become apparent from reading the following detailed description and appended claims, and upon reference to the accompanying drawings.

BRIEF DESCRIPTION OF THE DRAWINGS

Further features and advantageous developments of the invention can be found in the claims and the description and the drawing of two exemplary embodiments, wherein:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
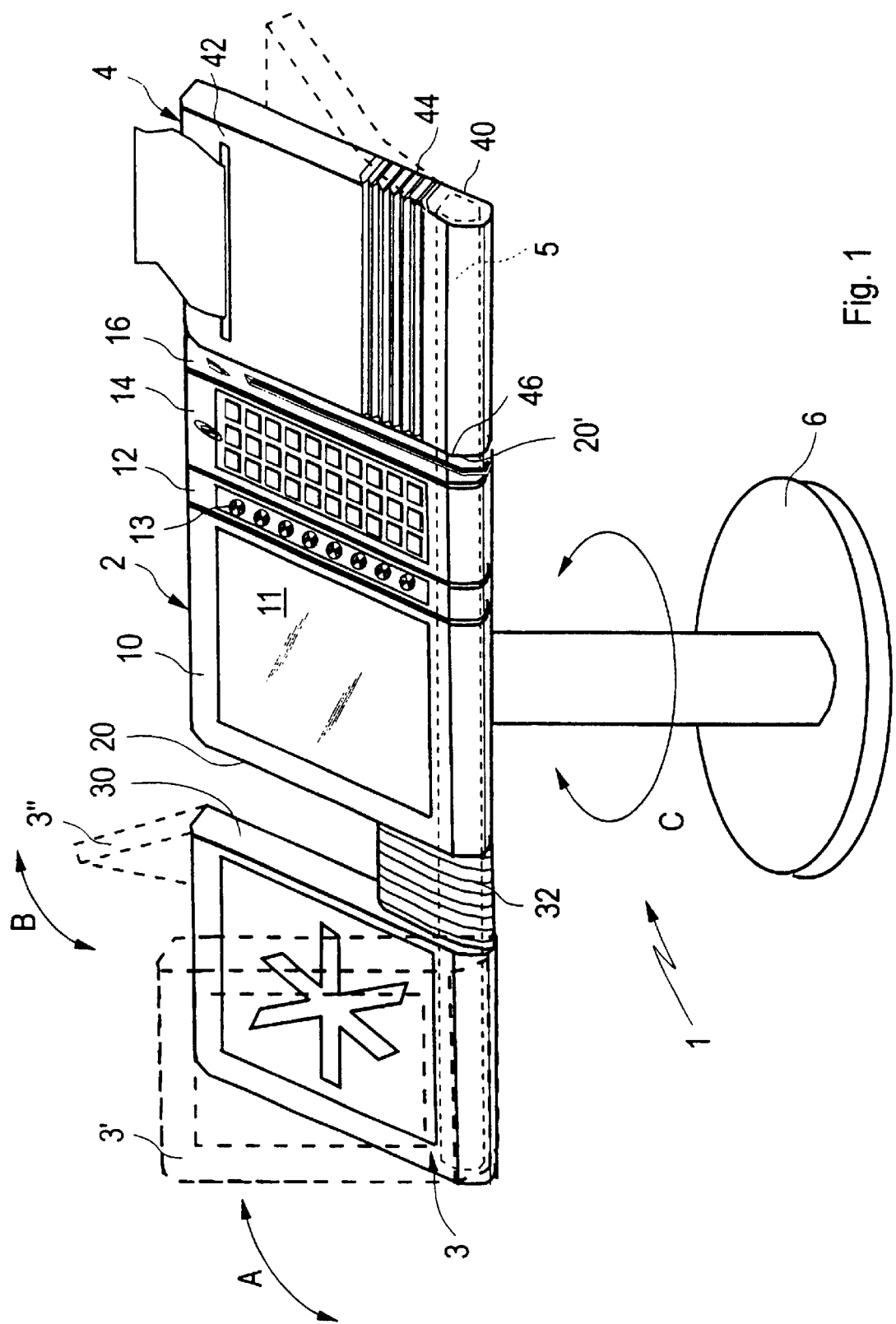
FIG. 1 is a perspective front view of a first exemplary embodiment of an operator unit with a bar code reader and a receipt printer.

FIG. 1 shows a perspective front view of a first exemplary embodiment of an operator unit which is designated by 1. Said unit 1 is composed of a block 2 against which a bar code reader 3, designed as a window reader, is positioned on the left and a receipt or label printer 4 is positioned on the right.

The block 2 which, is known particularly from WO 96/27861 A1, is composed of the peripheral devices of the display unit 10 and its input devices, namely a soft key bar 12, an input keypad 14 and a swipe-through magnetic card reader 16. The aforesaid peripheral devices 10 to 16 are joined one to the other without gaps. They have side profiles which correspond to one another so that a monolithic block 2 is produced. The cable duct 5 which is described in WO 96/27861 A1 for the block 2 also passes through the bar code reader 3 and the printer 4.

Of course, it is only necessary to use in the block 2 those input devices—soft key bar 12, input keypad 14 or swipe-through magnet card reader 16—which are necessary for the purpose of use provided. The mechanically simplest design of the block 2 is obtained if the screen 11 of the display unit 10 is combined with a touch-sensitive area to form a so-called touch screen or a pen computer display. Both elements can be accommodated in a common housing. Such an arrangement is very flexible since the entire screen area can be used for entry functions, but it is not inexpensive.

Frequently it is sufficient to use only one edge area of the screen 11 for manual entries. In this case, use is made of the soft key bar 12 which makes available a series of freely programmable keys 13, so-called soft keys, at the edge of the screen. The respective function of said keys is displayed on the screen.

If an input keypad is desired in addition or on its own, the input keypad 14 which is arranged in a separate housing should be accommodated in the block 2. A magnetic card reader, preferably the swipe-through reader 16 which is accommodated in a separate housing, is, if necessary, also accommodated in the block 2.

A simple configuration of the block 2 is also obtained when a so-called cash-register full-size keypad with or without a display medium integrated into its housing is used.

A tubular coupling part 32 is positioned against the side wall 30, facing the block 2, of the bar code reader 3 near to its lower edge facing the user. The other end of the coupling part 32 is connected to the adjacent side wall 20 of the display unit 10. For this purpose, the aforesaid side walls 20, 30 are provided in the vicinity of the coupling part 32 with break-throughs which are aligned with one another and with the cable duct 5. The bar code reader 3 can be adjusted with respect to the block 2 in the direction of the arrow A between a position in which it is aligned in terms of its surface with said block and a position with a more or less acute angle with respect to said block—a possible position is shown, for example, with 3'—in a plurality of increments or else in an infinitely adjustable way. Furthermore, the coupling part 32 can be bent at least about a perpendicular axis in the manner of a swan neck. The bar code reader 3 can thus be adjusted forward or rearward in the direction of the arrow B out of the position in which it is flush with the block 2, as is shown with 3" by way of example.

The housing of the receipt and label printer 4 is composed of a lower housing component 40 and an upper housing component 42 which are connected to one another in an articulated fashion. The articulated connection between the housing components 40, 42—in the simplest case a hinge—is enclosed by a folding bellows 44. The side walls 20', 46, facing one another, of the block 2 and of the lower housing component 40 are rigidly connected to one another. The cable duct 5 is continued in the lower housing component 40. The aforesaid side walls 20', 46 are, for this purpose, provided in the vicinity of the cable duct 5 with break-throughs which are aligned with one another.

The block 2 is provided on its rear side with an outgoing cable unit which is known from WO 96/27861 A1 and is therefore not illustrated here. The latter, and thus the entire operator unit 1, is mounted on a stand 6 so as to be pivotable about its vertical axis in the direction of the arrow C.

Figure 2:
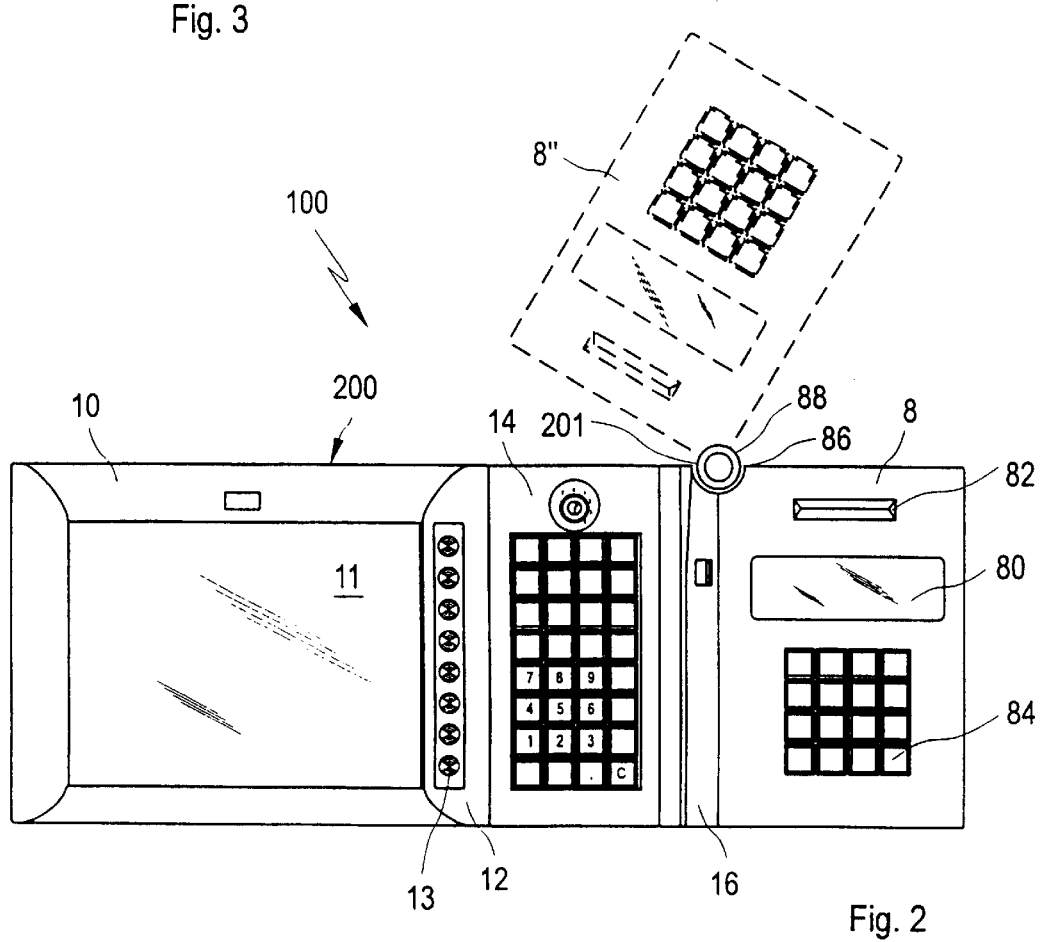
FIG. 2 is a plain view of a second exemplary embodiment of an operator unit with a pay terminal.

FIG. 2 shows a front view of a second exemplary embodiment of an operator unit which is designated by 100. Said operator unit is composed of a block 200 against which a pay terminal 8 is positioned on the right. The block 200 is of similar design to the block 2 known from the first exemplary embodiment. Identical components have the same reference symbols.

The pay terminal 8 is equipped with a display 80, a check or debit card reader and/or money value unit card reader 82 and a keypad for entering a personal identification number, a so-called PIN keypad 84. The mutually adjacent rear edge areas 201 of the block 200 and 86 of the pay terminal 8 are recessed in the manner of a chamfer. An essentially spherical bushing 88 on which the pay terminal 8 is held and can be pivoted about a vertical pivot axis 92 and inclined with respect thereto as desired is located in said chamfers. The connection between the bush 88 and the pay terminal 8 may for example be implemented according to the principle of a ball-and-socket joint which is known per se from camera tripods. The bush 88 has a cut-out passing through it, by means of which it is guided in a vertically displaceable fashion on a tubular coupling part, here a vertical pipe 90, with a cross section which corresponds to the cut-out. The pivot axis 92 coincides with the longitudinal axis of the vertical pipe 90.

The block 200 may be designed as a table-top device which can be positioned on a supporting face, for example a cash register desk or may be connected to the outgoing cable unit already mentioned in WO 96/27861 A1. In the exemplary embodiment illustrated in FIG. 3, the block 200, like the pay terminal 8, is equipped with a bush (not visible) by means of which it can also be displaced vertically on the vertical pipe 90. An elastic coiled cable 94 which is wound around the vertical pipe 90 here produces the electrical connection between the block 200 and the pay terminal 8. A coiled cable may also be passed through the inside of the vertical pipe if the latter is equipped with a longitudinal slit through which the ends of the coiled cable may emerge or if the ends of the coiled cable are led out of the vertical pipe 90 at its ends. It is also possible to produce a wireless data link, in particular using modulated infrared radiation, between the block 200 and the pay terminal 8.

Figure 3:
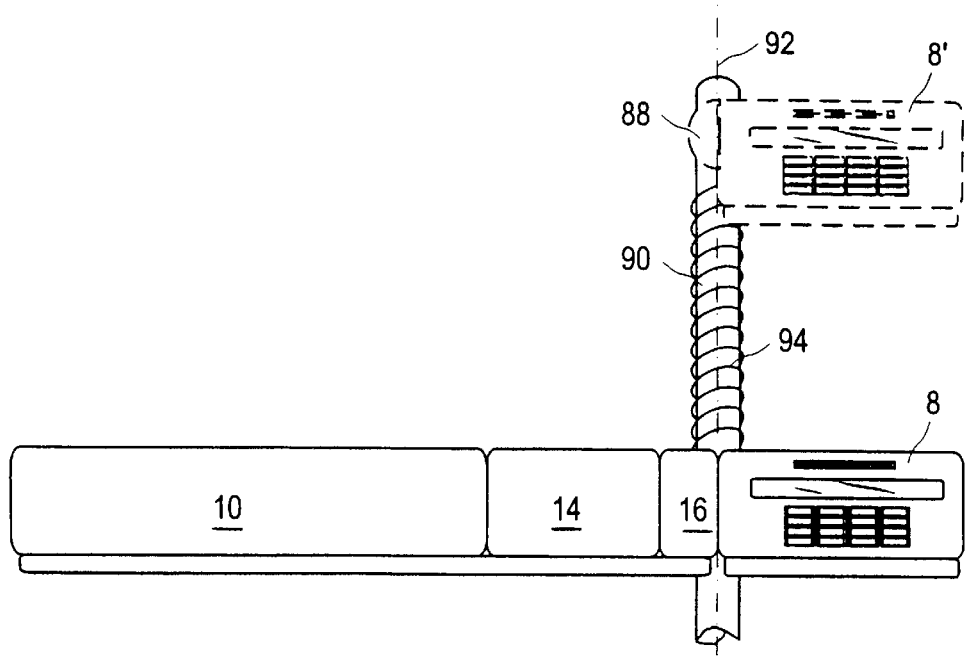
FIG. 3 is a front view of the arrangement shown in FIG. 2

As is shown by FIG. 3, the pay terminal 8 may be adjusted in its height relative to the block 200 between a position (represented by continuous lines), in which it is at the same height as the block 200 and any desired positions above this, one of which positions is represented with 8'. At the same time, the pay terminal may be pivoted about the vertical pipe 90 as desired and adjusted in its angle of inclination with respect to the latter. FIG. 2 shows the pay terminal 8 with continuous lines in a position in which it is located next to the block 200 in a row with it. In this position, all the peripheral devices 10, 12, 14, 16 and the pay terminal 8 can be operated from one side, the operator side. The pay terminal can, however, also be pivoted about the vertical pipe 90, at maximum into a position in which its rear side is located parallel to the rear side of the block 200. In this position, the block 200 can be operated from the operator side and the pay terminal can be operated from a customer side located opposite it. In FIG. 2 the pay terminal is shown in an intermediate position 8" by broken lines.

The vertical pipe 90 may, depending on the desired use, be on a table (not illustrated) or attached to a table or mounted on the floor or be part of a freestanding stand or at the same time be the strut of a goods shelf unit. The vertical pipe 90 can also be attached to the block 200 in such a way that the latter forms the base of the stand.

The present invention provides a series of possible variations: a pivotable peripheral device may be positioned against only one side of the block 2. This can also be a device other than the bar code reader 3 or the receipt and label printer 4. Each peripheral device can, according to one's wishes, be equipped with a tubular or swan neck-like coupling part 32 or with a two-part housing which is connected in an articulated fashion. It is also possible to combine both exemplary embodiments with one another by positioning a pivotable peripheral device, for example the bar code reader 3 or the receipt and label printer 4 against the free side of the block 200.

A plurality of supplementary devices, even ones which differ, may be attached one on top of the other to the vertical pipe 90. This is advantageous particularly if the vertical pipe 90 is at the same time the strut of a goods shelf unit. Each shelf can then be assigned a supplementary device.

The supplementary device does not have to be a pay terminal exclusively: other supplementary devices such as a registering device for a signature or a fingerprint in order to identify a customer, a display unit with or without touch screen or a further printer are also possible.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A modular operator unit comprising:

a block comprising at least one central device selected from the group consisting of a display unit, a keypad and a swipe-through magnetic card reader, and the block further comprising first and second opposing ends, the operator unit further comprising a cable duct and first and second peripheral devices, the cable duct extending through the block and connecting the first opposing end of the block to the first peripheral device, the cable duct further connecting the second opposing end of the block to the second peripheral device, the first peripheral device capable of being pivoted about a horizontal axis with respect to the central device, the second peripheral device capable of being pivoted about a vertical axis with respect to the central device, and the first peripheral device comprising an end facing the first opposing end of the block, the end of the first peripheral device being connected to the first opposing end of the block by a tubular coupling part.

2. The operator unit of claim 1 wherein the coupling part is a swan neck coupling part.

3. The operator unit of claim 1 wherein the coupling part is in alignment with the cable duct.

4. A modular operator unit comprising:

a block comprising at least one central device selected from the group consisting of a display unit, a keypad and a swipe-through magnetic card reader, and the block further comprising first and second opposing ends, the operator unit further comprising a cable duct and first and second peripheral devices, the cable duct extending through the block and connecting the first opposing end of the block to the first peripheral device, the cable duct further connecting the second opposing end of the block to the second peripheral device, the first peripheral device capable of being pivoted about a horizontal axis with respect to the central device, the second peripheral device capable of being pivoted about a vertical axis with respect to the central device, and the second peripheral device comprising a housing which comprises a lower housing component and an upper housing component, the lower housing component being flexibly connected to the upper housing component, the second peripheral device comprising an end facing the second opposing end of the block, the end of the second peripheral device being rigidly connected to the second opposing end of the block.

5. The operator unit of claim 4 wherein the cable duct extends into the lower housing component.

6. The operator unit of claim 4 wherein the lower housing component is connected to the upper housing component by a folding bellows.

7. A modular operator unit comprising:

a block comprising at least one central device selected from the group consisting of a display unit, a keypad and a swipe-through magnetic card reader, and the block comprising a rear wall and two opposing ends, one opposing end of the block being connected to a first peripheral device, the other opposing end, at the rear wall, being pivotally connected to a second peripheral device whereby the second peripheral device can pivot about a vertical pivot axis perpendicular to the rear wall.

8. The operator unit of claim 7 wherein rear wall of the block and the second peripheral device are connected by a tubular coupling part, the vertical pivot axis being coaxial with respect to a longitudinal axis of the tubular coupling part.

9. The operator unit of claim 8 wherein the second peripheral device is displaceable along the vertical axis.

10. The operator unit of claim 9 wherein the second peripheral device comprises a ball-and-socket joint attached to the tubular coupling part.

11. The operator unit of claim 8 wherein the block is displaceable along the vertical axis.

12. The operator unit of claim 11 wherein block comprises a ball-and-socket joint attached to the tubular coupling part.

13. The operator unit of claim 8 wherein the tubular coupling part comprises a vertical pipe.

14. The operator unit of claim 13 wherein the operator unit further comprises a plurality of supplementary devices mounted to the vertical pipe.

15. The operator unit of claim 14 wherein the vertical pipe is a strut of a shelf unit comprising at least one shelf, a supplementary device being assigned to the shelf.

16. The operator unit of claim 14 wherein the second peripheral device is a pay terminal comprising at least one device selected from the group consisting of a display, a keypad, a check card reader and a money value unit card reader.

17. The operator unit of claim 8 wherein the tubular coupling part is attached to a horizontal base selected from the group consisting of a table, a floor and a stand.

18. The operator unit of claim 8 wherein the block and the second peripheral device are further connected by a coiled cable which wraps around the tubular coupling part.

19. The operator unit of claim 8 wherein the block and the second peripheral device are further connected to one another by a wireless telecommunications link.

20. The operator unit of claim 19 wherein the wireless telecommunications link is an infrared telecommunications link.

* * * * *